T. W. FELTON.
COTTON CHOPPER.
APPLICATION FILED APR. 7, 1910.
972,836.
Patented Oct. 18, 1910.
2 SHEETS—SHEET 1.
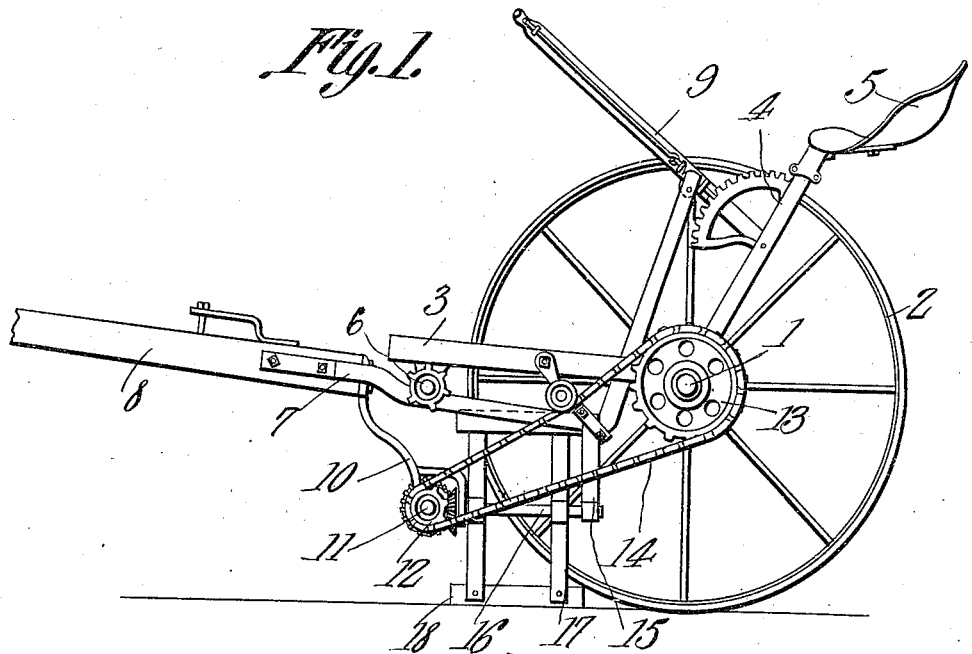
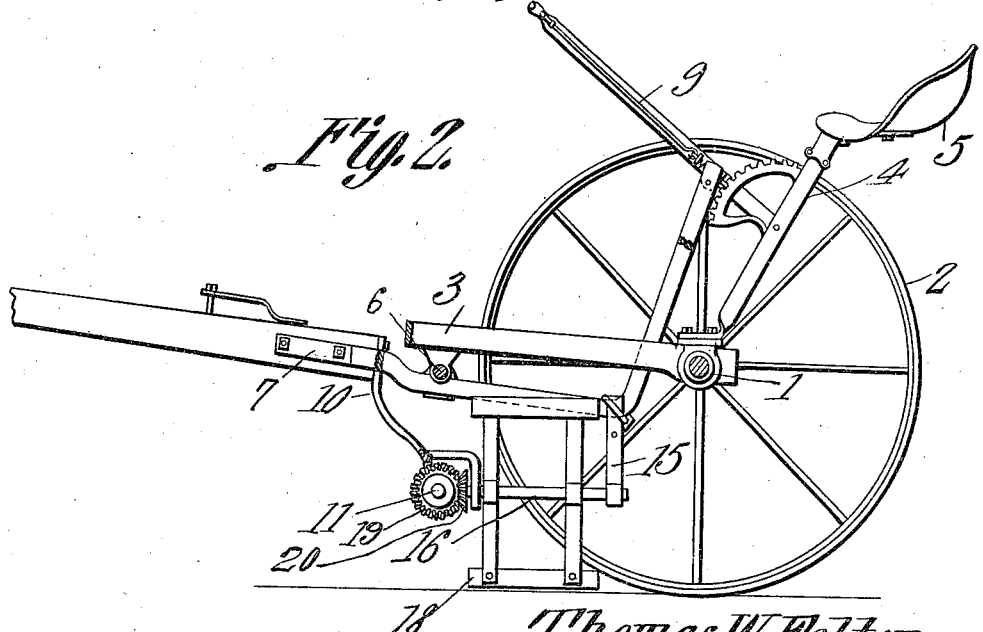
Witnesses
Thomas W. Felton
Inventor
by C. A. Snow & Co.
Attorneys

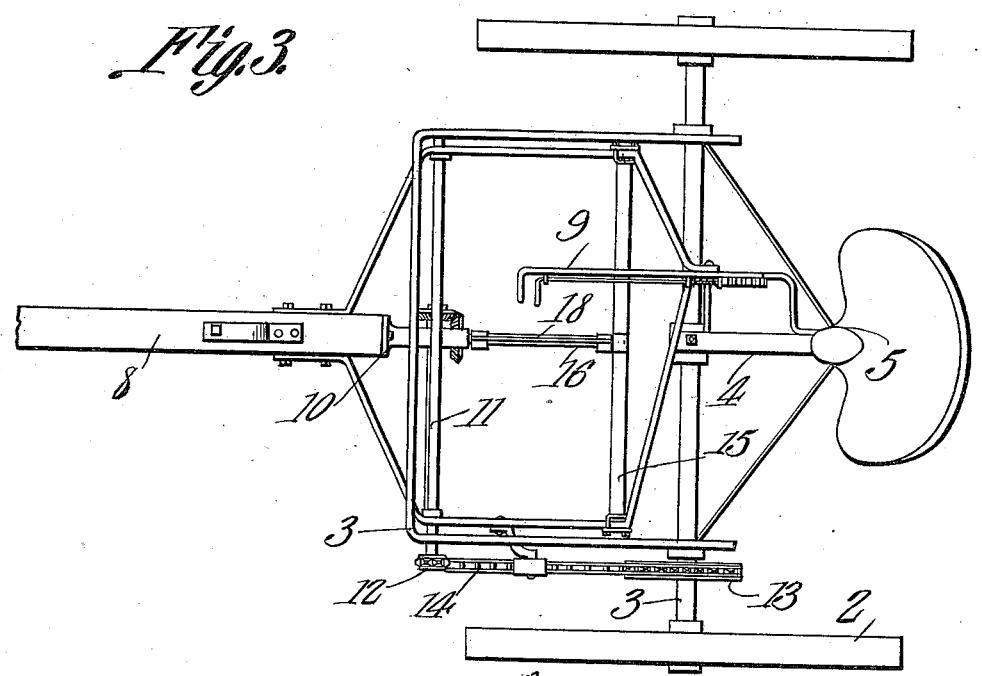
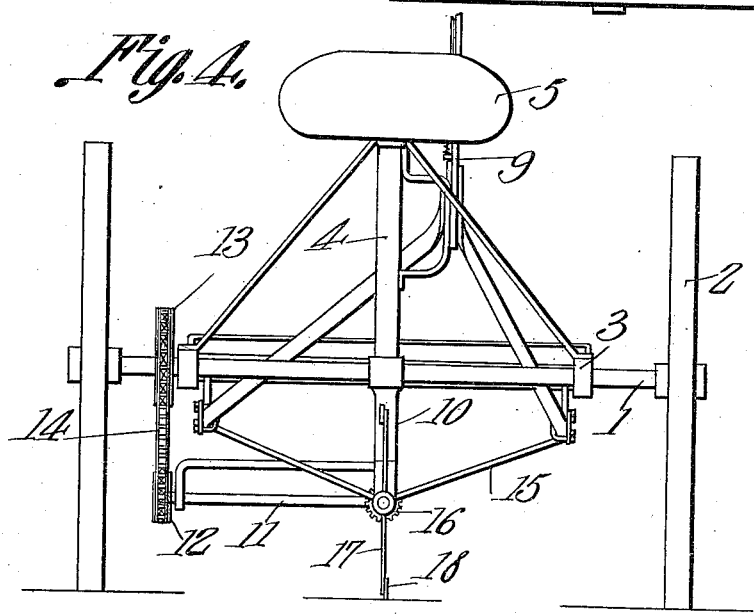

UNITED STATES PATENT OFFICE.

THOMAS W. FELTON, OF SAN GABRIEL, TEXAS.

COTTON-CHOPPER.

972,836.  Specification of Letters Patent.  Patented Oct. 18, 1910.

Application filed April 7, 1910. Serial No. 553,912.

*To all whom it may concern:*

Be it known that I, THOMAS W. FELTON, a citizen of the United States, residing at San Gabriel, in the county of Milan and State of Texas, have invented a new and useful Cotton-Chopper, of which the following is a specification.

This invention relates to a cotton chopper and consists in the novel construction and arrangement of its parts as hereinafter shown and described.

The object of the invention is to provide a simple and an effective cotton chopper in the form of an attachment adapted to be applied to the frame of a planter whereby the same may be transformed from a planting implement into a chopping or cultivating implement.

With the above object in view the cotton chopper includes front and rear brackets adapted to be applied to the frame of the implement and having a shaft journaled therein. Means is provided for transmitting rotary movement from one of the supporting wheels of the implement to the said shaft and the shaft carries a series of hoe blades which are adapted to operate successively upon the row of standing plants in the usual manner.

In the accompanying drawings, Figure 1 is a side elevation of the cotton chopper. Fig. 2 is a vertical longitudinal sectional view of the same. Fig. 3 is a top plan view of the same. Fig. 4 is a rear end elevation of the same.

Among the component parts of the implement to which the cotton chopper is to be applied are included an axle 1 mounted upon traction wheels 2 and journaled in a frame 3. Seat posts 4 are located upon the rear portion of the frame 3 and at their upper ends support a seat 5. A tongue frame 7 is pivoted to the frame 3 at the point 6 and at its forward end carries a tongue 8. The rear portion of the tongue frame 7 extends up through the frame 3 and is pivotally connected with a lever 9 which is pivoted upon the seat perch formed by the posts 4. Therefore it will be seen that when the lever 9 is swung the tongue 8 will be swung vertically with relation to the forward portion of the frame 3 or reversely the forward portion of the frame 3 will be swung vertically inasmuch as under normal conditions the forward ends of the tongue 8 is attached to the hames of the draft animal and therefore is held approximately in a fixed position or elevation above the surface of the ground.

A bracket 10 is fixed to the rear end portion of the tongue 8 and carries a stub shaft 11. A sprocket wheel 12 is fixed to one end of the shaft 11 and a sprocket wheel 13 is fixed to the axle 1. A sprocket chain 14 passes around the sprocket wheels 12 and 13 and is adapted to transmit rotary movement from the axle 1 to the shaft 11. The bracket 10 is detachably connected with the rear portion of the tongue and consequently may be readily removed when it is desired to use the implement as a planter or for other purposes.

A bracket 15 is detachably applied to the rear portion of the tongue frame 7 and a shaft 16 is journaled for rotation in the brackets 10 and 15. Radially disposed arms 17 are mounted upon the shaft 16 and at their outer ends carry chopping blades 18. A beveled pinion 19 is fixed to the intermediate portion of the stub shaft 11 and meshes with a beveled pinion 20 fixed to the forward end of the shaft 16.

From the above description it will be seen that as the shaft 11 rotates that rotary movement is transmitted through the intermeshing pinions 19 and 20 to the shaft 16 and that the arms 17 thereon will carry the blades 18 around and cause them to operate successively upon the plants standing in the row along which the machine is drawn. Therefore it will be seen that means is provided for causing the blades 18 to operate at variable distances below the surface of the soil and also a cotton chopper attachment is provided which may be easily and quickly applied to a frame without altering the same and rendering it unfit to be used for other purposes.

Having described the invention what I claim as new and desire to secure by Letters Patent is:—

In combination with a planter structure including a frame, wheels supporting the frame, a tongue frame pivoted thereto, a tongue attached to the forward intermediate portion of the tongue frame, a chopper attachment comprising a bracket detachably applied to the rear portion of the tongue, a laterally disposed shaft journaled to said bracket, means for rotating said shaft from the supporting wheels, a second bracket secured at its ends to the sides of the tongue frame at points in triangular relation to the point of attachment of the first said bracket with the tongue, a second shaft journaled for rotation at the lower parts of both of said brackets, means operatively connecting
5 said shafts together and chopping blades carried by the second mentioned shaft.

In testimony that I claim the foregoing as my own, I have hereto affixed my signature in the presence of two witnesses.

THOS. W. FELTON.

Witnesses:
JIM BARCLAY,
TON. A. FULCHER.